United States Patent [19]

Halpern

[11] Patent Number: 4,613,990
[45] Date of Patent: Sep. 23, 1986

[54] RADIOTELEPHONE TRANSMISSION POWER CONTROL

[75] Inventor: Samuel W. Halpern, Matawan, N.J.

[73] Assignee: AT&T Bell Laboratories, Murray Hill, N.J.

[21] Appl. No.: 624,455

[22] Filed: Jun. 25, 1984

[51] Int. Cl.[4] ............................................. H04B 7/00
[52] U.S. Cl. ...................................... 455/33; 455/52; 455/54; 455/69
[58] Field of Search .................. 455/67, 69, 33, 54, 455/52, 2, 68; 179/2 EB

[56] References Cited

U.S. PATENT DOCUMENTS

| | | | |
|---|---|---|---|
| 2,678,998 | 1/1950 | Young, Jr. ............................. | 455/69 |
| 2,924,703 | 2/1960 | Sichak et al. ......................... | 455/69 |
| 2,967,908 | 1/1961 | Gray et al. ............................ | 455/69 |
| 3,732,496 | 5/1973 | Boyer et al. .......................... | 455/69 |
| 3,906,166 | 9/1975 | Cooper et al. ................... | 179/2 EB |
| 4,309,771 | 1/1982 | Wilkens ................................ | 455/69 |
| 4,435,840 | 3/1984 | Kojima et al. ....................... | 455/33 |
| 4,512,033 | 4/1985 | Schrock ................................ | 455/2 |

OTHER PUBLICATIONS

IEEE Global Telecommunications Conference, "Transmitter Power Control for Cellular Land Mobile Radio", T. Nagatsu, T. Tsuruhara and M. Sakamoto, Nov. 11–Dec. 1, 1983, pp. 1430–1434.

*Primary Examiner*—Jin F. Ng
*Assistant Examiner*—Andrew J. Telesz, Jr.
*Attorney, Agent, or Firm*—Charles Scott Phelan

[57] ABSTRACT

Power levels of first and second stations (10, 11) in a cellular radiotelephone system are dynamically adjusted from only one (10) of them. The second station receives signals from the first and, on the basis of the level of those signals, first adjusts its own transmitter power level to be within a predetermined range and then directs the adjustment of the power level of the first station to be within a predetermined range. Parameters used in processing call handoffs are also adjusted to correspond to the power level adjustments to prevent false handoffs due to the power level changes.

11 Claims, 11 Drawing Figures

FIG. 3

| CONTROL PROCESSING UNIT MEMORY MAP |
|---|
| AD — ATTENUATION DIFFERENTIAL |
| CAC — CELL SITE ATTENUATION CODE |
| CSNATTST — CELL SITE NUMBER OF EXCESS ATTENUATION STEPS FOR SERVING RADIO |
| DCAC — DYNAMIC CELL ATTENUATION CODE |
| DMAC — DYNAMIC MOBILE ATTENUATION CODE |
| GCPCF — GLOBAL CELL SITE POWER CONTROL FLAG |
| GMPCF — GLOBAL MOBILE POWER CONTROL FLAG |
| HSTC — HIGH SIGNAL STRENGTH THRESHOLD FOR THE CELL SITE |
| HSTM — HIGH SIGNAL STRENGTH THRESHOLD FOR THE MOBILE |
| IMRS — INFERRED MOBILE RECEIVED SIGNAL STRENGTH |
| LSTC — LOW SIGNAL STRENGTH THRESHOLD FOR THE CELL SITE |
| LSTM — LOW SIGNAL STRENGTH THRESHOLD FOR THE MOBILE |
| MNATTST — MOBILE CURRENT NUMBER OF ATTENUATION STEPS |
| MOEXATTOLD — MOBILE EXCESS ATTENUATION, OLD |
| MPCEF — MOBILE POWER CLASS EQUALIZATION FACTOR |
| MPDIF — MAXIMUM POWER DIFFERENTIAL |
| NCAS — NUMBER OF CELL SITE ATTENUATION STEPS |
| NMAC — NOMINAL MOBILE ATTENUATION CODE |
| NMAS — MAXIMUM PERMITTED NUMBER OF MOBILE ATTENUATION STEPS |
| PRIH — HIGH HANDOFF THRESHOLD |
| PRIL — LOW HANDOFF THRESHOLD |
| PMC — PHYSICAL MAXIMUM ATTENUATION CODE FOR SERVING RADIO |
| S — AVERAGED ADJUSTED SERVING SIGNAL STRENGTH |
| SDCAC — STORED DYNAMIC CELL SITE ATTENUATION CODE |
| SDMAC — STORED DYNAMIC MOBILE ATTENUATION CODE |
| VCAC — VOICE NOMINAL CELLSITE ATTENUATION CODE |
| VMAC — VOICE NOMINAL MOBILE ATTENUATION CODE |

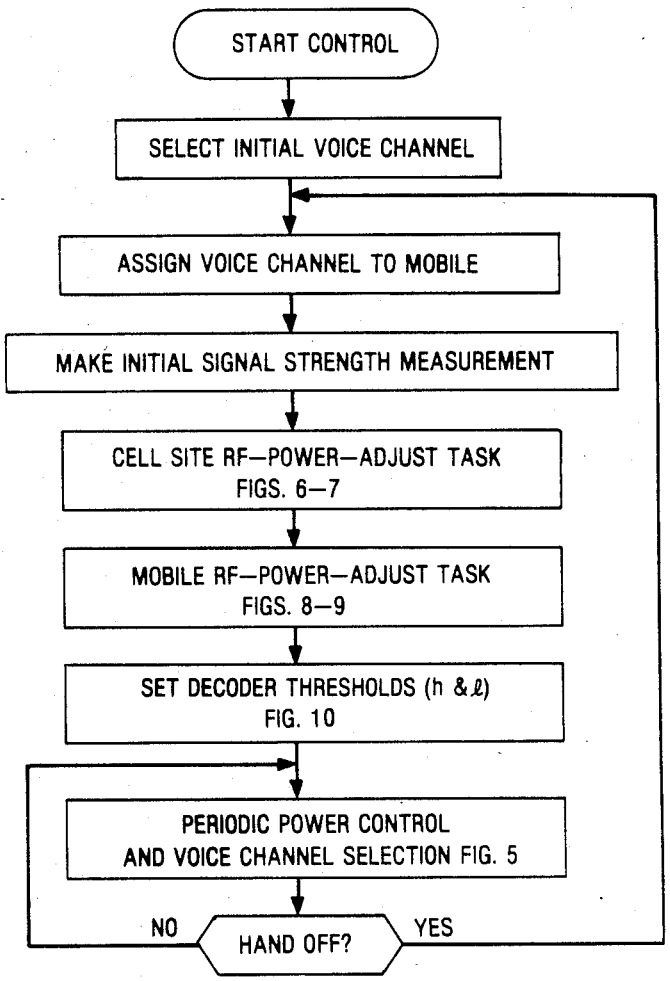

RADIOTELEPHONE TRANSMISSION POWER CONTROL

This invention relates to dynamic power control for radiotelephone transmitters in a system including at least one movable communication station.

BACKGROUND OF THE INVENTION

It has long been recognized that, in a radiotelephone system with at least one movable station in a communicating pair of stations, it is advantageous to provide for adjustment of transmission power of transmitting stations from time to time. The stations will then use only the lowest reliable power level and thereby reduce the likelihood of interference among cochannel stations engaged in different calls. One example of such a system is contained in U.S. Pat. No. 3,732,496 to M. L. Boyer. Another example, controlling movable station power in a cellular radio system, is U.S. Pat. No. 3,906,166 to M. Cooper et al. In the U.S. Pat. No. 2,678,998 to W. R. Young, Jr., an element of hysteresis is employed in the adjustment algorithm to avoid excessive switching when a subscriber unit is near the edge of a zone. A recent paper by T. Nagatsu et al., "Transmitter Power Control for Cellular Land Mobile Radio," *IEEE Global Telecommunications Conference,* Nov. 11–Dec. 1, 1983, pages 1430–1434, shows consideration of systems in which each of a pair of communicating stations directs adjustments at the other.

A J. Kojima U.S. Pat. No. 4,435,840 teaches a radio system in which station output power is adjusted in response to changes in traffic level to modify service area coverage.

Dynamic power control systems of the type just outlined typically engage in an iterative measuring-signaling-step-adjusting cycle until a desired transmission power level has been achieved. If each station of a communicating pair is aiding the other, each must include the same equipment both to control its own power and to help other stations adjust their transmission powers.

After such changes in transmitted power in systems where call handoff is based on some function of signal power, there are corresponding changes in the distance from the cell antenna site at which a subscriber unit call handoff will take place. Such distance changes create an uneven call handling situation in that, during low power operation, a subscriber unit call may be terminated because its signal quality is too low and yet the unit is too far from another cell site to improve its situation. Likewise, during high power operation, the unit may operate beyond its proper cell site coverage area into an adjacent cell coverage area and from there cause undue cochannel interference. This is especially true of personal portables which may experience wide swings in coverage as they are moved about among the floors of a tall building or even from one plane to another on the same floor.

SUMMARY OF THE INVENTION

The foregoing problems related to transmission power of radio units are alleviated in accordance with the present invention wherein the transmission powers of communicating stations are dynamically adjusted for a particular geographical relationship between those stations. Adjustment is accomplished under control of only one of the stations in a single power-adjustment step at each station, in response to measured received signal levels at the one station, whenever those levels fall outside predetermined signal level ranges for the respective stations. In a cellular mobile radiotelephone system the one station is advantageously that at the fixed cell antenna site, i.e., the cell site.

BRIEF DESCRIPTION OF THE DRAWINGS

A more complete understanding of the invention and the various features, objects and advantages thereof may be obtained from a consideration of the following detailed description, together with the appended claims, in connection with the attached drawings in which:

FIG. 3 is a memory map which is useful in considering the operation for the system of FIG. 1 in accordance with the present invention; and FIGS. 4–11 are process flow diagrams illustrating an implementation of the invention.

DETAILED DESCRIPTION

Figure 1:
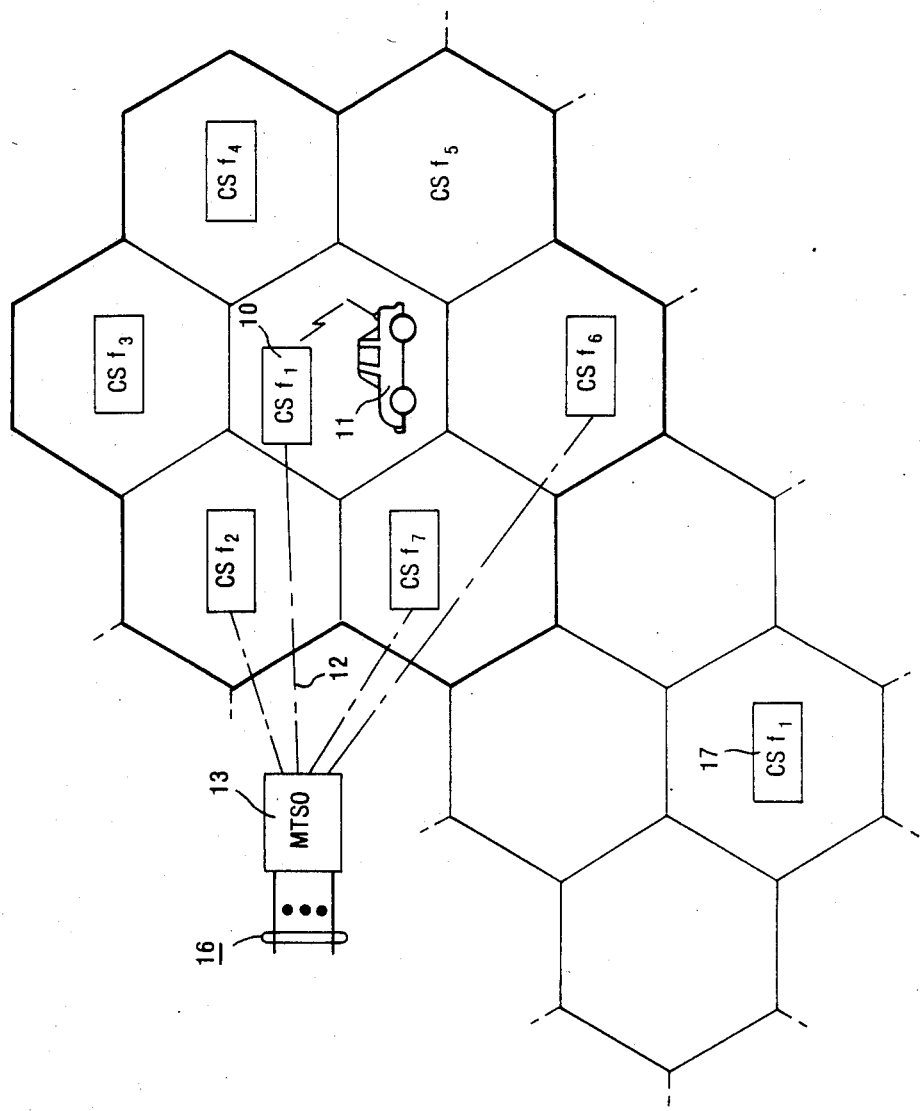
FIG. 1 is a simplified diagram of a typical cellular radiotelephone system in which the invention is advantageously employed.

FIG. 1 illustrates a portion of a known cellular mobile radiotelephone system which will be employed to describe the present invention. A reader interested in learning more about such a system may refer to a collection of papers describing the "Advanced Mobile Phone Service" found in Volume 58, No. 1 of the *Bell System Technical Journal,* January 1979. System operation is outlined herein only to the extent useful for facilitating an understanding of the invention.

In FIG. 1 there is shown the basic structure of the system. The service area to be covered in the system is divided into an appropriate number of cells having, for convenience of illustration, contiguous hexagonal configurations. Each cell includes at least one antenna site, such as the cell site 10, indicated in FIG. 1. That site, and other similar sites in other cells, is schematically represented by rectangles including the initials CS to designate the cell site. Each cell site has radio equipment and associated controls that are used to accomplish call connections with any subscriber unit, such as the vehicular mobile unit 11 in FIG. 1, located in the cell. The cell sites are interconnected to and controlled by a mobile telecommunications switching office (MTSO) 13 by respective sets of circuits such as the circuit set 12. Each circuit set includes advantageously a four-wire trunk circuit per radio channel served by the connected cell site and at least one data channel extending between the MTSO and the same cell site.

The MTSO is basically a telephone switching office with substantial capabilities for software control. It has trunk connections 16 to central offices (not shown) in the public switched telephone network. An MTSO advantageously also provides facilities to perform maintenance and testing and to record call information for billing purposes.

Each cell site, such as the site 10, is advantageously equipped with a separate radio transceiver for each voice radio channel and for each setup radio channel which is served by the cell site. Each cell site also includes one or more location radios which are tunable on command to monitor briefly signal quality for subscriber-unit locating purposes. The set of channels at a particular cell site is different from the sets of channels at the cell sites of each of the other cells in a predetermined recurrently employed pattern of cells. Such a set of channels for the cell site 10 is schematically represented by the reference character $f_1$ also included in the rectangle representing the cell site. Channel sets in the cells adjacent to that of cell site 10 are similarly designated with differently subscripted characters such as $f_2$ through $f_7$ to indicate that the pattern of cells illustrated includes seven such cells and is what is sometimes called an $N=7$ type of pattern. The pattern including those various channel sets is schematically defined by the broad black lines around the exterior portion of the pattern and including the illustrated cells of that pattern. A reuse of the channel sets in each similar pattern used throughout the serving area is schematically represented by the employment of the same channel set reference character in the cell site 17 in the lower left portion of the cells illustrated in FIG. 1. Other patterns may also be used.

Each radio channel of the system shown in FIG. 1 is advantageously a duplex channel. That channel includes a first frequency, sometimes called a downlink, which is dedicated to communication from the cell site transceiver for that channel to a subscriber unit in the coverage area served by the cell and engaged in a call. The other frequency, sometimes called the uplink, of the duplex channel pair is dedicated to communication from that same subscriber unit to the same transceiver in the cell site. The transceiver is then coupled to the MTSO by way of one of the trunks in the indicated circuit set 12 for the site.

In order to distinguish a desired channel signal from a cochannel signal from another cell, a supervisory audible tone (SAT), advantageously from a predetermined set of tones just above the high end of the voice frequency band, is modulated onto the channel by both the cell site and the subscriber unit. If either the cell site or the subscriber unit detects the presence of an incorrect SAT, the voice path will be interrupted because that is an indication that the transceiver has been seized by a cochannel signal. If this seizure lasts longer than a predetermined time interval, the cell will be terminated.

Although a vehicular mobile unit is illustrated in FIG. 1, manually carried portables also work in systems of this type; so it is expected herein to refer mainly to subscriber or mobile units for the purpose of including generically any movable station regardless of how it is moved, i.e., vehicularly or manually. It is further noted that although the cells are for purposes of convenience illustrated as contiguous hexagons, such figures are only an approximation of the actual area served by any given cell; and, in fact, the respective service areas of the respective cell sites overlap one another to a limited extent.

As a subscriber unit moves about the system from one cell to another when it is engaged in a call, the call is advantageously handed off from one cell site to another under the joint control of the cell sites involved and the MTSO as a result of recurrent monitoring snapshots of the call signal quality. In one handoff technique, the call signal quality is indicated by signal strength and that technique will be utilized herein for describing the present invention. Thus, for example, when the signal strength is perceived at the serving cell site to be below a predetermined level, i.e., threshold, a procedure is initiated to determine whether or not there is available another channel associated with a transceiver, either at the same cell site on a different face of the antenna system thereof or at the cell site of a different cell, which can receive the signal of the mobile unit at a level which is suitably above an indicated threshold. When such a more suitable channel on a different antenna face or at a different cell site is ascertained, the MTSO 13 switches trunk is appropriately to effect the call handoff while it is also directing the presently serving cell site to issue a data command by means of, for example, a blank-and-burst data signal on the voice channel then in use, to direct the subscriber unit to retune its transmitter to the new channel. The whole procedure takes an extremely short interval that is normally not detected by the subscriber using the unit.

In working systems, the topological features of the surface of the earth in the serving area generally include numerous departures from the theoretically perfectly spherical surface of the earth. These topological departures can cause corresponding variations in the quality of radio coverage provided to the area. Such topological departures may be due, for example, to undulations in the surface of the earth or sharply rising hills or large buildings. A typical system, however, includes a wide area transmission power level plan which takes account of the topological variations for both uplinks and downlinks within an individual cell and in adjacent and cochannel cells. Transmission power levels employed by the transceivers are fixed according to the plan in order to minimize cochannel interference in cases such as, for example, one in which perhaps the cell site 17 may be at the top of a rather high hill while all of the surrounding area extending at least as far out as the cell site 10 may be much lower and relatively flat. In such a case, the nominal transmitting power level assigned for use at the cell site 17 would be lower than the average for other surrounding cells to take account of the fact that it can readily, with the lower power level, communicate with mobile units within its cell. With that lower power level, it will likewise be less likely to cause cochannel interference in the cell of the cell site 10.

Still, there can be cases in which a subscriber unit, in a pair of its cell which is relatively remote with respect to its cell site, will be received by its own cell site at a lower level than a signal from another subscriber unit in a different cochannel cell. This results in the cochannel signal capturing the receiver at the subscriber's cell site. An incorrect SAT is then detected in the subscriber's cell site, and the consequent loss of supervision may result in termination of the cell, i.e., a call cutoff. Individual portable subscriber units are particularly susceptible to such cutoff effects because they can be carried by the user either on the streets or into buildings or to upper floors of buildings. It is relatively easy for them to be in locations which have a clear line of site path to only one of either their proper serving cell site antenna or the antenna of a cochannel cell site.

The remainder of the present description deals with an improved method for dynamically controlling transmitted signal power to reduce the incidence of call cutoffs. It will be seen as the description proceeds that this method is compatible with a system transmission power level plan and that the implementation of the improved method requires no departure from the present "Cellular System Mobile Station—Land Station Compatibility Specification" which is referenced in the rules of the Federal Communication Commission relating to the operation of cellular radiotelephone systems. That is, the improved method is implemented in the cell sites by employing only the received subscriber unit cell signal strength as seen by the cell site and the facility for remotely controlling adjustment of subscriber unit transmission power, which facility already exists in subscriber units in commercial service.

Figure 2:
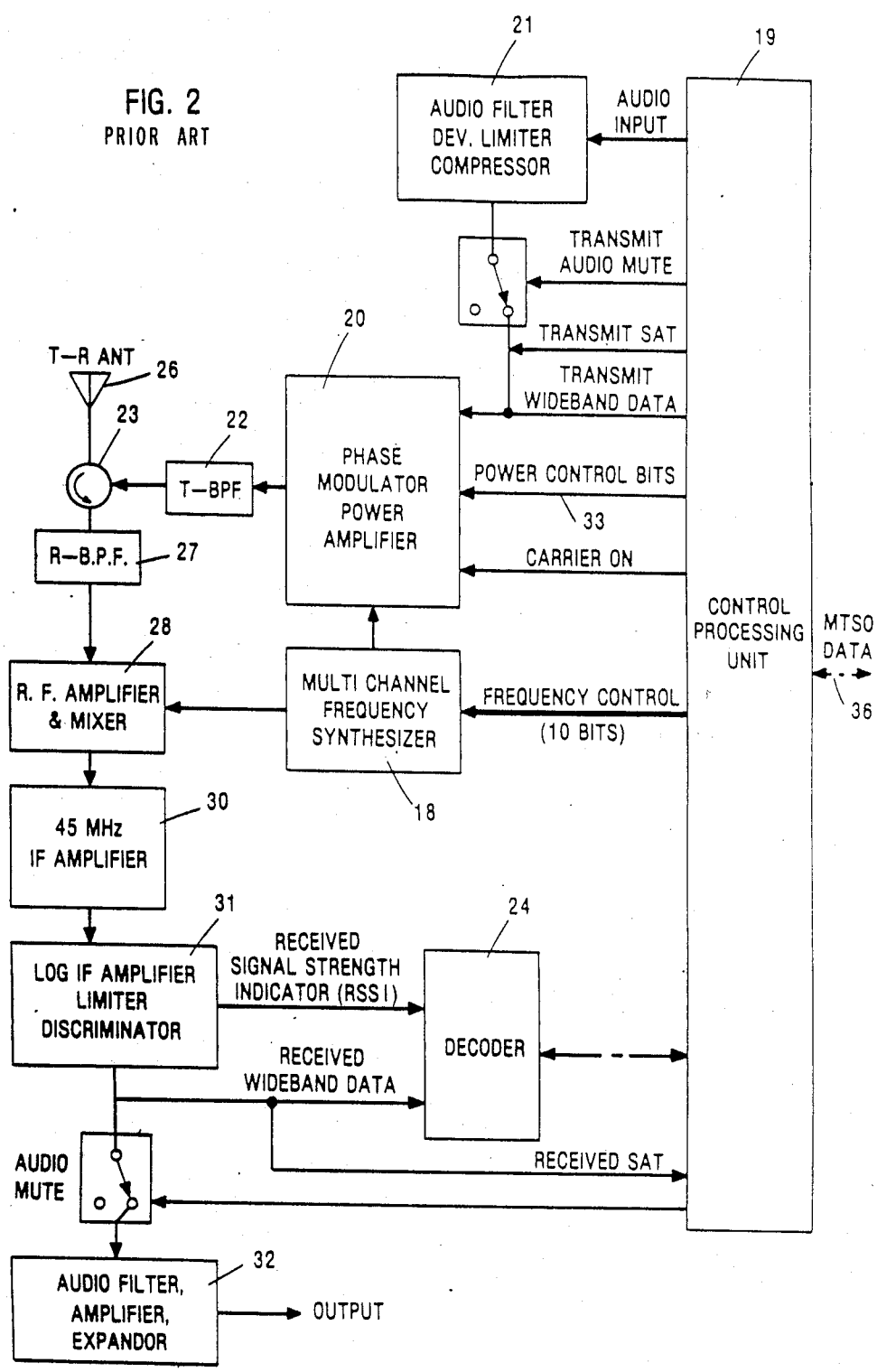
FIG. 2 is a block and line diagram of a radio transceiver of a type in which the present invention is employed.

FIG. 2 depicts a stored program controlled type of radio transceiver which is known in the art and is useful in both the cell sites and the subscriber units of the system illustrated in FIG. 1. This transceiver is of well-known configuration, and details thereof do not contribute to an understanding of the present invention. It will be herein described in only sufficient detail to show that the transceiver lends itself to adjustment of transmitter power in response to received command signals.

The FIG. 2 transceiver unit is a simplified diagram of a frequency modulation transmitter-receiver. It employs duplex voice transmission and reception in two segments of the radio frequency band which are separated by 45 megahertz for cellular mobile communications. That frequency is equal to the transceiver intermediate frequency (IF) so that one frequency generating system, represented by a multichannel frequency synthesizer 18, may serve as the frequency determining source of both the transmitter and the receiver sections. The transceiver unit also includes a number of other basic blocks which operate together in a manner hereinafter outlined.

First, the frequency synthesizer 18 generates any one of predetermined plural stable carrier frequency signals upon digital command from a logic unit such as a control processing unit 19 in the drawing. One portion of the synthesizer power output is applied to a transistorized modulator-amplifier chain circuit 20 wherein it is either phase modulated with audio input which has been processed through audio filtering, limiting, and amplitude compression in a circuit 21 or it is frequency modulated with wideband data applied from the control processing unit 19. The resulting modulated carrier is amplified to a suitable output power. The resulting signal is then coupled through a band pass filter 22, for harmonic and spurious signal removal, and through a circulator 23 to a vertically polarized transmit-receive antenna 26.

Received signals entering the antenna 26 arrive at a receive band pass filter 27 which protects the mixer from out-of-band signals. Output from the filter 27 is amplified in a radio frequency amplifier and mixed with a local oscillator signal, derived from the frequency synthesizer 18, in a circuit 28.

Outputs signals from the mixer 28 are amplified by an IF amplifier circuit 30. Output from the circuit 30 is then filtered, limited, and demodulated by a frequency discriminator all in a circuit 31. The resulting audio signal is applied through a further circuit 32, wherein it is subjected to audio filtering, amplification, and expansion for utilization either in a telephone handset in the case of a subscriber unit or for transmission to the MTSO in the case of a cell site transceiver. It wideband data is present in the output of the circuit 31, it is coupled through a peripheral processing unit called a decoder 24 (in at least a cell site transceiver) to the control processing unit 19. The decoder function is often considered to be included in the control processing unit function. It is here separately shown because it enters into operation of one embodiment of the invention as will be hereinafter described. For that purpose, the decoder advantageously employed is usually shared among several radios and is taught in the copending D. J. Thomson application Ser. No. 497,228, filed May 23, 1983, entitled "Data Detector Using Probalilistic Information in Received Signals," and assigned to the same assignee as the present application. The disclosure of that Thomson application is hereby incorporated herein by reference.

One of the functions of the control processing unit 19 is to develop signals employed for controlling the transmission power level of the transmitter of the station. To this end, the decoder 24 receives from the amplifier in the circuit 31 signals which are indicative of the received signal strength, and these are called the received signal strength indicator (RSSI) signals. They are obtained from what is called a log IF amplifier portion of the circuit 31. Such amplifiers are well known and comprise, for example, a cascade of progressively saturating differential amplifiers. Diode detectors are connected at the output of each amplifier stage. Output currents from those detectors are summed in a network providing a log-amplifier output voltage called the RSSI signal. This RSSI voltage advantageously rises smoothly and monotonically over an input signal range of predetermined size such as, for example, −110 to −30 dBm measured at the antenna 26.

Those RSSI signal variations are advantageously compared by decoder 24 to threshold values, provided by control processing unit 19; and decoder 24 signals unit 19 when the RSSI is outside a specified range. Processing unit 19 thus uses data which it has stored or computed, as will be subsequently herein described, to develop a multibit digital power control signal which is applied on a circuit 33 to the power amplifier portion of the circuit 20 for controlling transmitter power level. The power control signal is advantageously employed at that amplifier to select a signal level in a feedback path of the amplifier for thereby regulating the RF power at a level specified by those digital signals. When a different output level is required as specified in a change in those digital power control signals, a new amplifier feedback level is chosen, e.g., by appropriate digitally controlled analog switching means.

Cell site setup, location, and voice radios include signal receiving and decoding circuit chains as in FIG. 2. Decoded RSSI signals are used for subscriber-unit locating purposes.

The table shown below indicates various RF transmitter power levels currently specified by the FCC for subscriber units in the aforementioned Compatibility Specification. Eight different power levels are possible and are designated by respective different codes, i.e., mobile attenuating codes (MAC), for three different classes of subscriber transceiver operation. Illustrative examples of operating situations which could fall into the different classes include in Class I a vehicular mobile unit transceiver, in Class II a personal portable unit operated in a vehicle with an external antenna, and in Class III a personal portable unit otherwise operated with its own antenna and not in a vehicle.

| TABLE OF MOBILE STATION NOMINAL POWER LEVELS | | | |
|---|---|---|---|
| | Nominal Effective Radiated Power (ERP) in dBW for Mobile Station Power Classes | | |
| MAC | I | II | III |
| 0 | 6 | 2 | −2 |
| 1 | 2 | 2 | −2 |
| 2 | −2 | −2 | −2 |

-continued

TABLE OF MOBILE STATION NOMINAL POWER LEVELS

| MAC | Nominal Effective Radiated Power (ERP) in dBW for Mobile Station Power Classes | | |
|---|---|---|---|
| | I | II | III |
| 3 | −6 | −6 | −6 |
| 4 | −10 | −10 | −10 |
| 5 | −14 | −14 | −14 |
| 6 | −18 | −18 | −18 |
| 7 | −22 | −22 | −22 |

Before a call is set up, a subscriber unit transmits its power class to the cell site on a control channel used for call setup. This digital information is received on a setup radio and sent to the cell site's control processing unit 19. The cell site therefore knows the subscriber unit's power class and therefore its radiated power level for any value of mobile attenuation code that it may send to the subscriber unit.

Illustrative relative power levels for cell site transmitters are shown in the table below. These eight relative levels are designated by respective different codes, i.e., cell-site attenuation codes (CAC), for a particular cell site transmitter power amplifier.

TABLE OF CELL-SITE AMPLIFIER POWER LEVELS

| CAC | Output Power in dB Relative to Maximum |
|---|---|
| 0 | 0dB |
| 1 | −4 |
| 2 | −8 |
| 3 | −12 |
| 4 | −16 |
| 5 | −20 |
| 6 | −24 |
| 7 | −28 |

The maximum output power for a cell site power amplifier depends on the type of amplifier used. A high power amplifier, for example, may deliver an output that produces 100 watts of effective radiated power at the transmit antenna, while a low power amplifier, for example, may deliver an output that produces only 25 watts of effective radiated power.

Given the type of amplifier used, a value of CAC is selected that will produce an effective radiated power that is in accordance with the power level plan for that site.

The control processing unit 19 in a subscriber unit performs interface functions with the subscriber by receiving commands from the subscriber input through a control unit, i.e., a station set (not shown but schematically included in unit 19 if in a movable subscriber unit). In addition, the unit 19 in the subscriber unit performs interface functions with the cell site in the cell in which the subscriber unit happens to be operating by receiving and transmitting wideband data communicated through the radio link. As a part of the wideband data interface with the cell site, unit 19 monitors various transceiver functions and issues control signals to appropriate parts of the transceiver.

In a cell site, the control processing unit 19 is typically a single controller which performs control functions for all of the channels, and their transceivers, of a predetermined set of channels through which the cell site serves its cell area. Some of the control functions in a cell site can, of course, be distributed to subsidiary processors, for example, on a per channel basis or otherwise shared among the channels. The unit 19 in the cell site interfaces with the subscriber unit by sending commands in the form of data messages as previously outlined and by receiving data messages from the subscriber unit and containing information about the subscriber unit operation, as well as requests for particular services input either by the subscriber unit itself directly or by the subscriber through the control unit of the subscriber unit. In addition in the cell site, the control processing unit 19 interfaces with the MTSO by data messages on a data circuit 36 which is part of the circuit 12 previously mentioned in connection with FIG. 1. These data messages exchanged with the MTSO encompass the transmission of commands from the MTSO to the cell site for its own operation or for distribution to a subscriber unit, as well as providing the MTSO data messages relating to the operation of different aspects of the cell site and of the various subscriber units served by the cell site.

As to transmission power level control, the cell site processing unit 19 responds to the RSSI signals derived from its signal receiving chain, illustratively via decoder 24, for autonomously computing the appropriate power level for its own transmitter and adjusting its own transmitter power as necessary so that the signal received at a subscriber unit will be within a predetermined range, or window at the subscriber unit. That window provides for an advantageous power level for reliable transmission in accordance with the aforementioned power level plan. In addition, the processing unit 19 in the cell site directs the adjustment of the subscriber unit transmitted power as necessary so that the signal received at the cell site will be within a predetermined range, or window at the cell site. This is achieved by way of a data message injected at the cell site transmitter and transmitted, hence, on the radio channel to the transceiver of that subscriber. A method for implementing this type of dynamic transmission power level control is depicted in the flow diagrams of FIGS. 4 through 11, which are hereinafter described.

In connection with that description of the flow diagrams, FIG. 3 depicts a memory map for a portion of memory (not separately shown) in control processing unit 19 for a cell site. Shown on that map are names, or mnemonics, for the various codes and other values held, at least temporarily, in memory to be utilized in the power control process. Those values are employed in the aforementioned flow diagrams of FIGS. 4 through 11. For reader convenience the names are shown in alphabetical order.

FIG. 4 depicts a high level process flow diagram for the dynamic power level control method here under consideration. It indicates the major divisions of the process and the subsequent figures of the drawings in which more details can be found.

Figure 5:
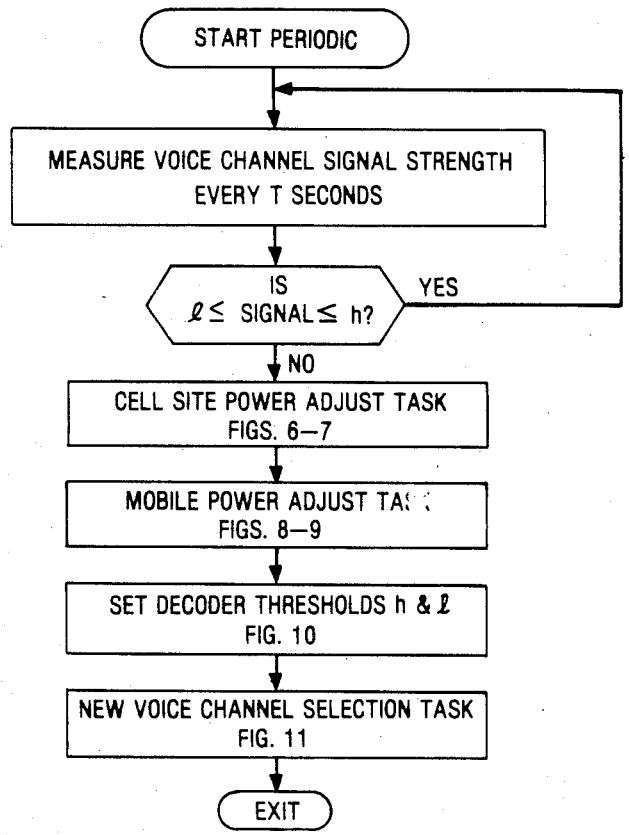

All transmitters initially operate at their nominal effective radiated powers established according to the system level plan that is in effect. Initially, a voice channel is selected by known techniques to serve a subscriber unit call. That channel is usually an available voice channel at a cell site and antenna face which evidences the best signal reception for the subscriber unit and the cell site. The selected channel is assigned to the subscriber unit, and an initial signal strength measurement is made after the subscriber unit arrives on the voice channel to confirm that transmission quality is adequate. Then, the cell site power adjustment task is carried out, as will be described in connection with FIGS. 6-7, followed by a subscriber-unit power adjustment task as will be discussed in connection with FIGS. 8-9. Decoder 24 high and low thresholds h and l, which will be used afterward for initiating power adjustment work by control processing unit 19, are then set as will be outlined in regard to FIG. 10. Thereafter, periodic power control and voice channel selection, including handoff decisions, are executed in a fashion similar to the initial actions just described, and as shown in FIG. 5. If handoff takes place, a new voice channel assignment is executed followed by the same steps as described for the initial voice channel assignment.

In accordance with FIG. 5, signal strength received on the selected cell site voice channel is measured every T seconds after the initial decoder threshold setting action, and compared in decoder 24 to the previously mentioned thresholds h and l. If the signal strength is less than h and greater than l for that channel, there is no action until a new measurement time occurs. Thus, the decoder, by performing this screening function, saves the control processing unit 19 from having to do that work. If measured signal strength is above h or below l, cell site and mobile unit power adjustment tasks of the type mentioned in regard to FIG. 4 are executed by the control processing unit 19; and decoder thresholds are reset to new values if necessary. A new voice channel selection task, FIG. 11, including the FIG. 4 handoff decision task, is also carried out.

Figure 6:
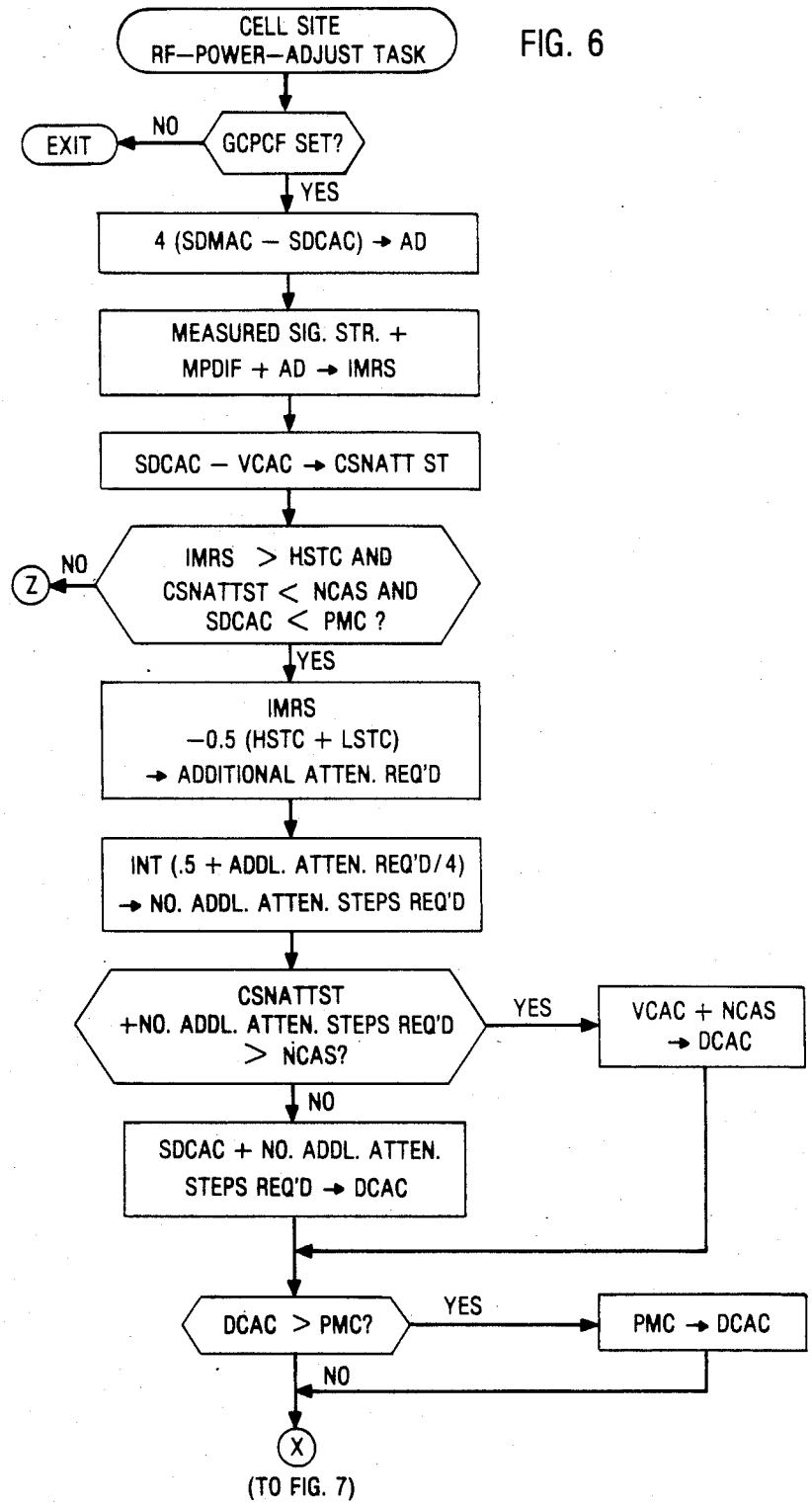
Figure 7:
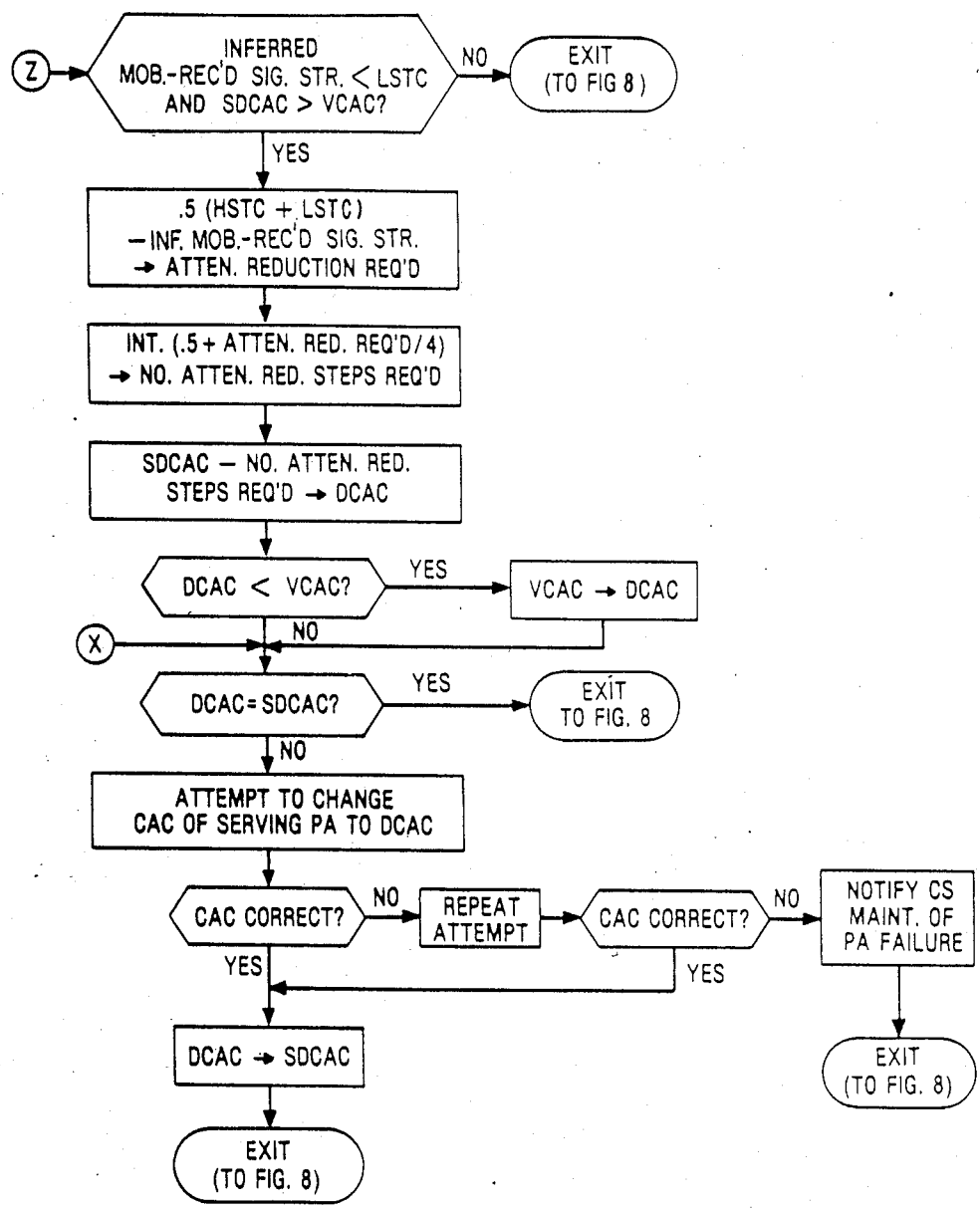
Figure 8:
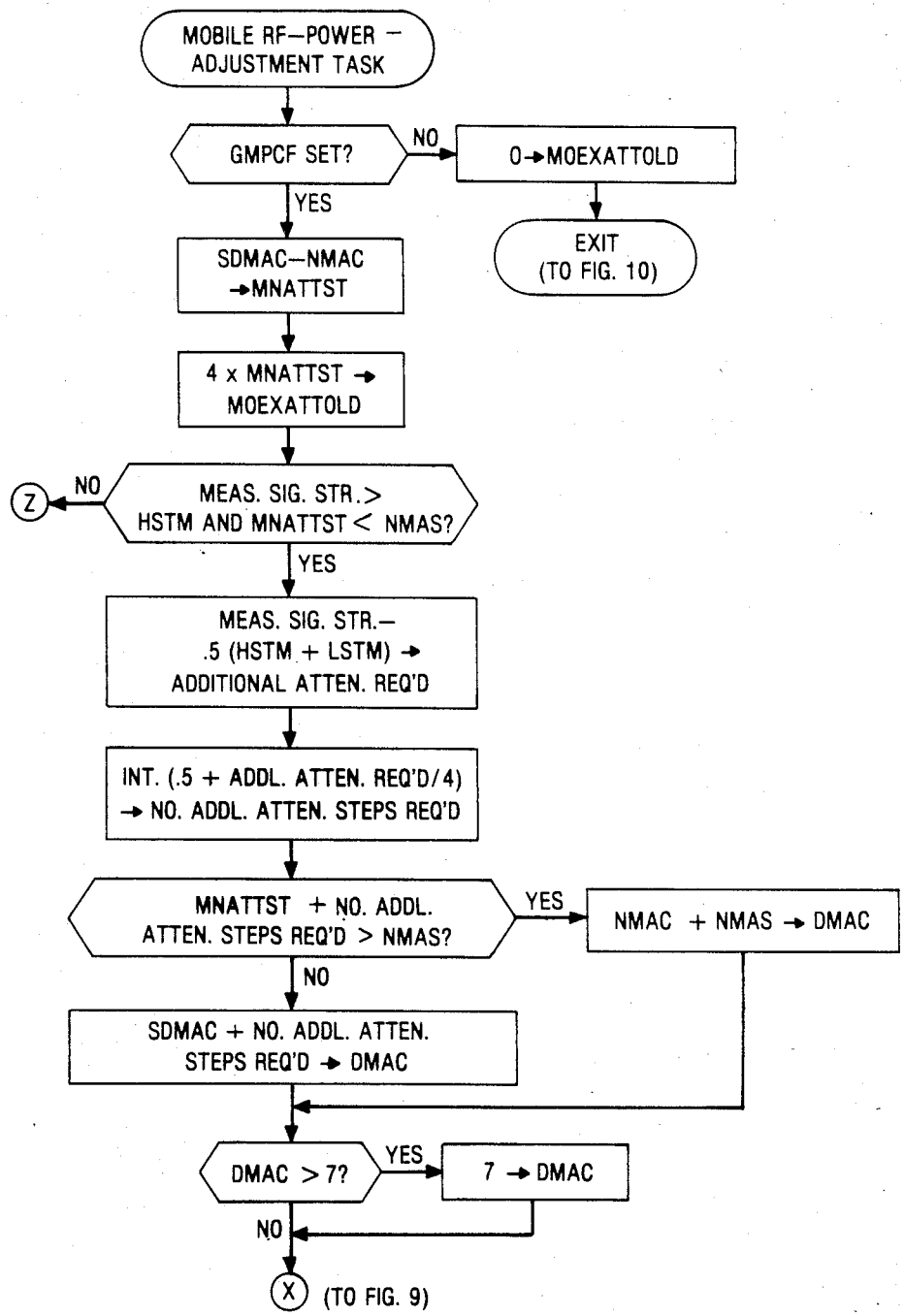
Figure 9:
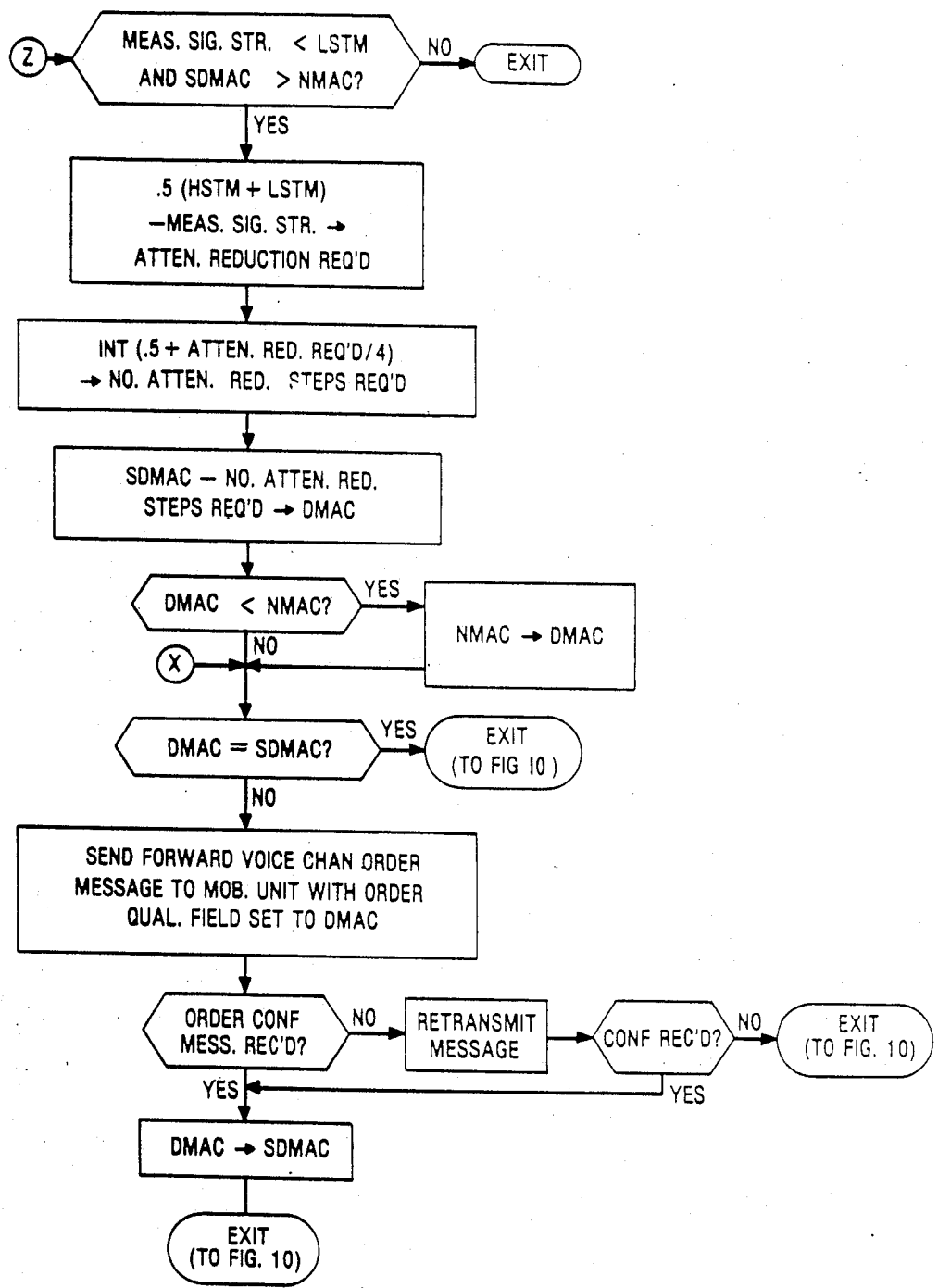

FIGS. 6-7 illustrate the Cell Site RF Power Adjustment Task. The task starts in FIG. 6 after a measurement of signal strength that was taken on a voice channel as in FIG. 4 or 5 as appropriate. First, a test is made to see whether or not a global cell site power control flag (GCPCF) is set. That flag indicates whether or not the power control feature is available on the system. If the flag is not set, the process exits to the Mobile RF Power Adjustment Task (FIGS. 8-9). If the flag is set, an attenuation differential (AD) is calculated and stored. When a subscriber unit is assigned to a voice channel initially or after a handoff, the stored dynamic cell site attenuation code (SDCAC) and the stored dynamic mobile attenuation code (SDMAC) are set to their nominal values given by VCAC and NMAC respectively. VCAC is the nominal voice-channel cel attenuation code for the cell site power amplifier type that is used, and NMAC is the nominal mobile attenuation code for the subscriber unit of the given power class that is being served. The value of NMAC may be specified for each of the three mobile-station power classes, or it may be derived for each of the three power classes from a single value of nominal voice-channel mobile attenuation code VMAC, as illustrated in the following table.

| VALUES OF NOMINAL MOBILE ATTENUATION CODE | | | |
|---|---|---|---|
| | NMAC | | |
| VMAC | I | II | III |
| 0 | 0 | 1 | 2 |
| 1 | 1 | 1 | 2 |
| 2 | 2 | 2 | 2 |
| 3 | 3 | 3 | 3 |
| 4 | 4 | 4 | 4 |
| 5 | 5 | 5 | 5 |
| 6 | 6 | 6 | 6 |
| 7 | 7 | 7 | 7 |

Values of VCAC, VMAC and NMAC are stored in the site controller 19. Four times the difference expressed in decibels (dB) between the two stored dynamic codes is the attenuation differential AD. Each code is a number, advantageously from zero to seven, representing equal steps of attenuation. Steps of 4 dB are employed for purposes of illustration. The value AD will be used to calculate the signal strength at which the mobile is receiving signals from the cell site.

The next step in FIG. 6 calculates inferred mobile received signal strength (IMRS). This is done by adding to the signal strength previusly measured at the cell site the calculated AD and a maximum power differential (MPDIF) factor. That factor represents the difference in powers that would be radiated by a Class I mobile unit putting out full power (MAC=0) and a cell site putting out full power (CAC=0) from an amplifier of predetermined wattage. It has been found that by modifying the measured value of signal strength received at the cell site by the maximum radiated power differential between cell site and mobile and by the assigned attenuation differential AD between cell site and mobile yields a useful approximation of the signal strength that is received at the mobile, i.e., inferred strength of cell site signals as received at the mobile. That result, achieved by what is called a reciprocity calculation, eliminates the necessity for the mobile to make a measurement or send a measurement to the cell site or otherwise have special equipment or processes not already in commercially available mobile units.

Having determined inferred mobile received signal strength (IMRS), it is necessary to find out to what extent additional cell site attenuation may already be in place relative to the nominal level as a result of some prior use of the channel. For example, if the process is currently operating in the periodic power adjustment part of FIG. 4, there may be additional attenuation in place from the initial power adjustment operation of FIG. 4. The extent of additional attenuation is determined by subtracting from a stored dynamic cell-site attenuation code (SDCAC), i.e., the most recent attenuation setting from dynamic operations, the value of VCAC. The difference is the cell-site number of excess attenuation steps (CSNATTST) for the serving ratio power amplifier. When a cell is first set up, or immediately after an handoff, SDCAC is the same as the VCAC. Therefore the difference between these two is initially zero because the system normally starts an amplifier at nominal power. Consequently, the number of excess attenuation steps is zero. Later, if the cell site power amplifier is attenuated to levels below its nominal, the number of the code SDCAC (i.e., steps of attenuation) will, of course, increse and so will the value of CSNATTST.

The next step in FIG. 6 is to determine whether or not there are any limits in effect which would prevent adjustment of cell site attenuation. Actually, three tests are involved, and an affirmative result on all is necessary for further adjustment to take place. Before discussing that, however, it is useful to point out that in operating a cellular system on the basis of signal strength, it is advantageous to do so with a high signal strength threshold for the cell-site signal (HSTC) and a low signal strength threshold for the cell-site signal (LSTC) which define in dB a received signal strength window, or range, at the subscriber unit for an advantageous compromise between strong signals for quality communication and excessive signal strength that causes objectionable cochannel interference. If signals received at the subscriber unit, as inferred at the cell site, i.e., IMRS, are outside those window limits, power adjustments at the cell site are to be undertaken.

First, among the three tests to be made is for the cell site to determine whether or not the cell site signal as received at the subscriber unit is above HSTC. If IMRS, as calculated by the cell site, is greater than HSTC, one of the three conditions is satisfied. If it is less than or equal to HSTC, no dynamic power adjustment is required; and the process jumps to point Z in FIG. 7 for evaluation in regard to the low signal strength threshold, LSTC, as will be described.

It has already been noted that a channel transmitter power amplifier may at any given time have some numbers of attenuation increments or steps already in circuit as a result of prior operations, i.e., CSNATTST. That value is in memory as shown in FIG. 3 and is here compared to a maximum permitted number of cell attenuation steps (NCAS). That maximum is seven in one embodiment, but it could be a smaller number if circumstances were such that, e.g., it would be useful to limit to three steps below nominal, even though the physical equipment would allow seven steps. If CSNATTST is less than NCAS, a second of the three conditions is met; but if it is equal to NCAS no adjustment can be made; so the process exits to FIG. 7 as before. The third test is similar to the second, but it involves a comparison between the numbers of attenuation steps represented by SDCAC and the physical maximum attenuation code (PMC) number of steps allowed by the equipment. Thus, equipment with less than seven attenuation steps can be used.

Assuming that the three-test decision process indicates that power level adjustment can be made, the next step of the process determines the adjustment target, i.e., how many more steps of attenuation are to be put in or removed. The goal of dynamic power control is to put the signal strength received at the subscriber unit at approximately the midpoint between the high threshold HSTC and the low threshold LSTC, i.e., midway in the operating window. This is done by first subtracting the average of HSTC and LSTC from the inferred mobile received signal strength to find the amount of additional attenuation in dB required at the cell site power amplifier to put its transmsisions within the window at the mobile. Since it was earlier noted that attenuation is illustratively accomplished in steps of 4 dB, the additional attenuation value is divided by four and added to a half. The integer value of the result is the number of additional steps of attenuation needed to set the power level at the midpoint of the window.

Continuing in FIG. 6, the steps of additional attenuation just determined are added to the number of excess attenuation steps CSNATTST already in the amplifier path, and that sum is compared to the maximum NCAS permitted. If the sum is greater than NCAS, the sum is discarded and NCAS is added to the VCAC to obtain and store the dynamic cell attenuation code (DCAC) (in number of steps). If the sum of CSNATTST plus required additional steps is less than or equal to NCAS, the sum is again discarded; and the number of additional steps required is added to the value (in number of steps) of stored code SDCAC to get and store the new value of DCAC. Whichever of the two foregoing ways is used to determine DCAC, that value is tested against PMC (also in number of steps); and, if larger, PMC is used for DCAC. The current DCAC value is used in a jump to point X in FIG. 7, as will be described in regard to FIG. 7, to achieve the power level adjustment. First, however, attenuation is redirected to the testing-for-limits step in FIG. 6 and the negative results thereof which caused a jump to Z in FIG. 7.

In FIG. 7 any negative result from the aforementioned limits test initiates a similar set of tests related to the low signal strength threshold LSTC for the cell site. Here the IMRS is tested against LSTC; and if less, the first of two conditions is met for continuing the adjustment process at the cell site. If IMRS is equal to or greater than LSTC, the process exits to adjust mobile power level (FIG. 8) as will be described. In a second test the SDCAC is compared to VCAC to determine how the current stored value relates to the nominal value. If the stored (SDCAC) value is greater, the second condition is met; and if not, the process exits to adjust the mobile. When both conditions are met, the affirmation result, the process moves on to determine how much attenuation reduction is required to bring operation back up to the midpoint power level of the window.

What is done here is similar to what was done before in FIG. 6. Now, however, the required reduction in the number of attenuation steps is subtracted from the SDCAC to determine an initial value of DCAC without a need to check CSNATTST again. In general, if DCAC is less than zero, DCAC is set equal to zero. In the illustrative embodiment, it is not permitted to reduce attenuation enough to make the power level greater than the nominal so this new DCAC (in number of steps) is checked against the value of the nominal VCAC. If less, the value of VCAC becomes the new DCAC. If equal or greater, DCAC is used as is; and the process proceeds, i.e., from point X, to use the current DCAC value to adjust power level.

The current value of DCAC at the point X in FIG. 7 where various branches of the process converge, is tested to determine whether or not it is the same as the immediately prior value, i.e., SDCAC. If the same, the process exits to the mobile adjustment task of FIG. 8. If different, the process proceeds to change the cell site amplifier output attenuation code (CAC) (in number of steps) to the value DCAC and test to determine that the change took place. If the new CAC was correctly changed, DCAC is stored in the location for SDCAC represented in FIG. 3; and the process exits to the mobile task in FIG. 8. If the new CAC is not correctly changed, one retry is made. If that too fails, an alarm is set to notify cell site maintenance that the power amplifier is not working right, and then the process exits to the mobile task in FIG. 8.

Attention is now directed to FIGS. 8 and 9 and the mobile RF power adjustment task. This task for the mobile is carried out in the cell site control processing unit, and the similarities to names of variables and process steps of the corresponding FIGS. 6–7 task for the cell site are evident. Of course, the term "mobile" as used here still has reference to a transceiver of any of the three power classes previously mentioned.

The process has just come out of the cell site power adjustment task, and is now entering the mobile power adjustment task. First, a test is made to determine whether or not a global mobile power control flag (GMPCF) is set to indicate (when set) that the power adjustment feature is to be used. Since separate flags are employed for the cell site (GCPCF) and the mobile (GMPCF), the power adjustment feature can be used in either or both of the cell sites and the mobiles of the system. In any event, and as previously indicated, when a cell site voice channel transmitter is turned on, and when a mobile transmitter first starts operating on a voice channel, they always come on at nominal power. If the power adjustment feature is turned off at the cell site or at the mobile, the corresponding transmitter will operate at nominal power.

If GMPCF is not set, a zero value is stored in a FIG. 3 location called mobile excess attenuation, old (MOEXATTOLD). Then the process exits to FIG. 10.

Assuming in FIG. 8 that GMPCF is set, the current number of additional attenuation steps at the mobile (MNATTST) is calculated as the difference between the stored dynamic mobile attenuation code (SDMAC) and the nominal mobile attenuation code (NMAC) (each in number of attenuation steps). MNATTST is zero the first time this step of the process is executed on a given voice channel because the mobile initially comes up on nominal power. This may not be the case the second or other time through.

Notice a difference between this mobile adjustment task and the cell site adjustment task. The reciprocity calculation in the cell site adjustment task is not done here because the actual value of the mobile signal strength received at the cell site is available.

The next step is to multiply MNATTST by four to get the excess attenuation in dB and store that value in MOEXATTOLD shown in FIG. 3. Then, to see if any limits are in effect, the measured mobile signal strength (RSSI) is compared to the high signal strength threshold for the mobile signal received at the cell site (HSTM). If the RSSI is greater, one of two conditions is met for continuing the adjustment task; if not, the process jumps to Z in FIG. 9 for further testing to be described. A test is also made in FIG. 8 to see whether or not the mobile's current number of excess attenuation steps is less than the maximum permitted number of mobile attenuation steps (NMAS). If it is, the second condition is met and the adjustment task continues; but if not, the process jumps to Z in FIG. 9.

Assuming an affirmative result, the additional attenuation required in dB is determined, that value is converted to a number of attenuation steps required to bring operation approximately to the midpoint of the window between HSTM and LSTM, and a useful value of dynamic mobile attenuation code (DMAC), in steps of attenuation, all are determined in essentially the same way previously described for the cell site. The final operation in FIG. 8 is to limit the value of DMAC to the maximum of seven permitted by the aforementioned Compatibility Specification before jumping to the process branch convergence point X in FIG. 9.

In FIG. 9, and starting at point Z, the process steps are shown for determining DMAC in the case of measured mobile signal strength less than LSTM. That is, it is tested against LSTM, and the useful number of steps for DMAC are determined as before for the cell site before reaching the process branch convergence point X. If DMAC and SDMAC are the same, the process exits to FIG. 10. When it is determined that the DMAC value is different from the prior value of SDMAC, the cell site sends a forward voice channel order message to the mobile unit that contains an order qualifier field set to the DMAC value just determined. That message is advantageously sent using a blank-and-burst technique, known in the art, on the voice channel. If the mobile unit does not return a blank-and-burst confirmatory message, the original message is repeated one time. If that is not confirmed, the process exits to FIG. 10. If either DMAC message is confirmed, the value is stored in SDMAC (for use on the next power adjustment task performed on the same channel) and the process exits to FIG. 10.

Notice that it could happen that both messages to the mobile were not received properly, which means that the mobile may not have changed its power level as directed. That means that the cell site keeps the old stored value of dynamic mobile attenuation code (SDMAC), and the next time the proceeds is executed for the channel, the same stored value is used. Of course, there is a possibility that the mobile did not get the new value, but the cell site did not get the confirmation; and the two would be temporarily somewhat out of adjustment synchronization. However, since the order message directed a new setting, and not just a new differential, the system restores synchronization after one or two more times through the process.

The thresholds in both the cell site process and the mobile process are independent of each other, and so are the maximum permitted number of attenuation steps that can be used.

It is preferred that the cell adjustment task take place first before the mobile adjustment task. The control of the cell site power amplifier is advantageously exercised over wires in the cell site. There is relatively little chance of error in the exercise of control over wires within the cell site as compared to use of, e.g., a radio link. In the case of the mobile unit adjustment, the radio channel is used; and there is a possibility that the mobile will not be able to change as directed. However, by doing the cell site adjustment first, and if it is necessary to remove excess attenuation, the cell site comes up to full adjusted power before attempting to do the mobile adjustment. That improves the chance of the mobile getting the message and responding correctly.

After completing the two tasks of mobile power level adjustment and the cell site power level adjustment, the next thing is to make adjustments to the thresholds h and l used by the decoder 24.

Figure 10:
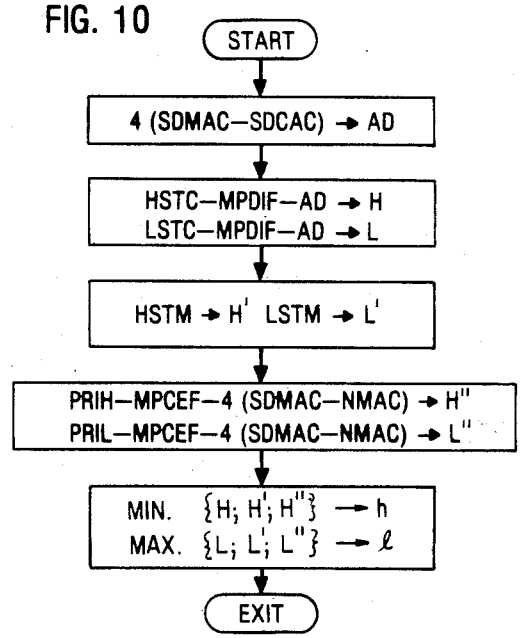

FIG. 10 shows a process for setting the decoder level-screening thresholds h and l to be used by decoder 24 or level responsive signaling to control processing unit 19 to initiate power adjustment routines. (The screening function was described in connection with FIG. 5.) This FIG. 10 process is executed after the mobile power adjustment task has been completed, as illustrated in FIGS. 4 and 5. h and l are the values supplied to the decoder from unit 19 and against which the decoder microprocessor controller compares RSSI signals to determine whether or not to signal unit 19 to review power level and handoff. The three functions of adjust cell site output power, adjust mobile output power, and location/handoff each involves use of a separate signal level window each defined by a pair of threshold levels (a high and a low) that could be used by the decoder with respect to its RSSI signal input to determine whether or not action is needed as to one or more of the functions. To simplify the checking performed by the decoder in the illustrated embodiment, the cell site software overlays the three windows to derive two unique thresholds, a single high h and a single low l. The decoder high threshold h is set to the lowest of the high threshold values for each of the three actions, while the low threshold l is set to the highest of the low threshold values for each of the three actions. If no power adjustments are made, then the decoder can continue to use its resident thresholds, h and l.

In FIG. 10 the newly determined values of SDMAC and SDCAC are subtracted and the difference multiplied by four to obtain the new value for AD in dB. Next, the HSTC value (which relates to the cell-site signal received at the mobile unit) has subtracted therefrom the previously used MPDIF and the new AD values to obtain an upper cell-site power adjustment decoder-related threshold H (which relates to the RSSI signal seen by the cell site decoder). LSTC is similarly modified to obtain a lower cell-site power adjustment decoder-related threshold L.

The upper and lower, mobile power adjustment, decoder-related thresholds H' and L' are set equal to HSTM and LSTM, respectively, without adjustment.

The high and low primary location threshold values PRIH and PRIL are each reduced by a mobile power class equalization factor (MPCEF) and further reduced by the quantity 4 (SDMAC-NMAC) to obtain decoder-related threshold values H" and L" respectively. This adjustment is needed to compensate for any excess attenuation in effect at the mobile unit due to dynamic power control adjustments and to compensate (using MPCEF) for a mobile that is not a Class I unit as will be later described with regard to the voice-channel selection task shown in FIG. 11.

Finally, the minimum among the values H, H', and H" is selected to be the new value of h. Similarly, the maximum among the values L, L', and L" is selected to be the new value of l. Those h and l values are supplied to the decoder 24 for use in subsequent operations, and the process exits to the periodic power control and voice-channel selection tasks (FIG. 5) or to the voice-channel selection task (FIG. 11) as appropriate. It should also be understood that the value of h may at times turn out to be less than the value of l. This is because thresholds H, H", L, and L" are not fixed, but depend on the amounts of power adjustments that are in effect. It is therefore possible that one of the high decoder-related thresholds (H, H' or H") may fall below the level of the highest value of the three low decoder-related thresholds (L, L' or L"). When this happens, the decoder sends the RSSI signal strength value to control processing unit 19 for further action. The screening function played by the decoder will only take place when h is greater than l. This can be expected to be the case most of the time.

Figure 11:
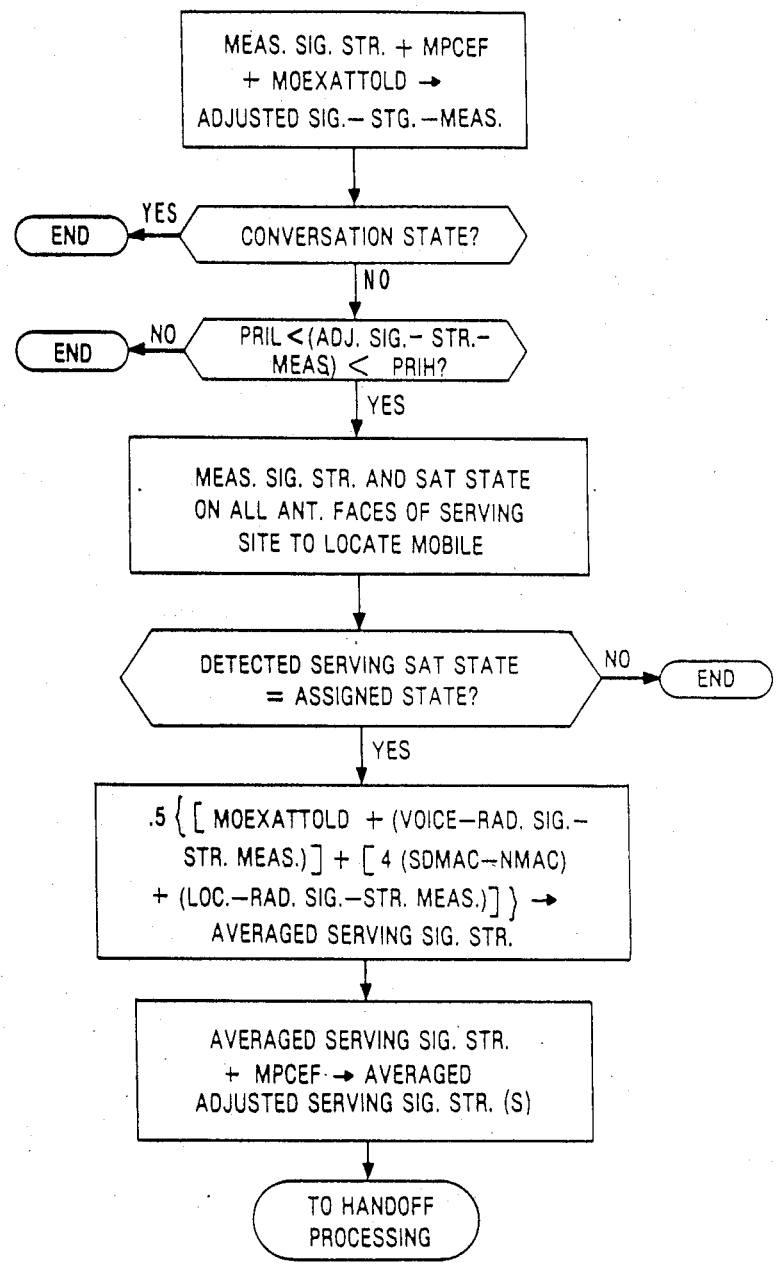

The voice-channel selection task related to handoff is considered in connection with FIG. 11. The selection decisions are not based on the actual received signal strength is a power-adjusted mobile unit because adjusted signal strength from the mobile may be lower than it would be at nominal power level since excess attenuation may have been added or for some reason prior excess attenuation may not have been removed. Handoff decisions are based upon what power would be received at the cell site from the mobile if that mobile were a Class I mobile and transmitting at nominal power. So, because the mobile may not be transmitting at nominal power or it may not be a Class I unit, it is necessary first to calculate what the received signal level from the mobile would be if it were a Class I unit transmitting at nominal power. First, the process of FIG. 11 takes the actual measured signal strength received at the cell site from the mobile and adds to it what is called a mobile power class equalization factor (MPCEF). That factor makes all mobiles look as though they were a Class I mobile, even if they may not be. The value MPCEF is given by the following table as a function of the nominal voice-channel mobile attenuation code VMAC hereinbefore referred to, and the mobile-station power class of the mobile unit being served:

| VMAC | Values of MPCEF in dB | | |
|---|---|---|---|
| | I | II | III |
| 0 | 0dB | 4dB | 8dB |
| 1 | 0 | 0 | 4 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |

Besides MPCEF, there is also added to the actual measured signal strength received at the cell site the mobile excess attenuation, old, (MOEXATTOLD) in dB. That MOEXATTOLD had been determined in FIG. 8. The sum of the three values is the adjusted signal strength measurement.

The signal strength that is used in the FIG. 11 equalization step is the signal strength that was measured at the cell site before the mobile was adjusted and used in the FIG. 8 process. Before the cell power adjustment task or the mobile power adjustment task, a measurement of the mobile signal strength was taken for use in the beginning of the process shown in FIG. 6. It is this measured value of mobile signal strength that is still at hand for use in FIG. 11. That mobile signal strength measurement is adjusted now to what it would have been if transmitted at nominal power.

After testing to be sure the mobile is still in a conversation state, the adjusted signal strength measurement is compared to a primary signal strength window established by a primary high threshold (PRIH) and a primary low threshold (PRIL) for a handoff decision. If that measurement is outside the primary signal-strength window, i.e., greater than PRIH or less than PRIL, the voice-channel selection task continues. If the adjusted measurement value was within the window, the process ends since no handoff is required. Assuming that the adjusted measurement is outside the window, a mobile unit location recheck is made using a location radio (not shown) at the cell site serving the call. A location radio is one used, as is well known in the art, at a cell site for switching rapidly among active voice channels to collect received signal strength data to be used in a system call handoff determination. Such data is now collected for the mobile's current channel on all antenna faces of the serving cell site, including the serving face, to determine whether or not the signal on the serving face is presently outside the primary signal strength window and to have handoff data available if it is. By using both an earlier measurement made with a voice radio and a current measurement using a location radio, there is less likelihood of triggering a false handoff. As a part of the radio data collection, supervisory audio tone (SAT) being transponded by the mobile unit (as required by the FCC rules for cellular mobile units) is also detected so that location radio data resulting from signals including incorrect SAT can be discarded.

Next in FIG. 11 adjustments are made to the new signal strength measured on the location radio for the serving antenna face because the mobile power adjustment task may have changed the power level at which the mobile is transmitting. So an averaged serving signal strength is determined. A first term in the average is the sum of the old excess mobile attenuation value MOEXATTOLD (the value in dB determined in FIG. 8 following the flag test) and the value of signal strength measured by the voice radio receiver. That sum represents transmission at a level that would have been measured if the mobile had been radiating at its nominal power level for its given power class. The second term in the average is the sum of (a) four times the difference between the current stored dynamic mobile attenuation code (SDMAC) and the nominal value (NMAC) (that product being the new excess mobile attenuation in dB) and (b) the location radio signal strength measurement. In summary, the averaged serving signal strength is based upon an old measurement made to appear as if the mobile were at nominal power, and a new measurement made to appear as if the mobile were at nominal power, both for its given power class. That averaged value is utilized in call handoff processing as already mentioned in regard to FIG. 4.

Before comparing the just computed signal strength figure to the threshold window, the mobile power class equalization factor (MPCEF) is first added in to obtain an averaged adjusted signal strength (S) that looks as if it came from a Class I mobile at nominal power. That averaged adjusted signal strength is used for determining whether or not a call handoff is required and for implementing handoff as may be necessary. Various methods known in the art can be used for that purpose and comprise no part of this invention. However, this invention allows for handoff as a result of an adjusted signal strength being either above a threshold, PRIH, or below a threshold, PRIL. As an example of a method that can be used to determine handoff, reference is directed to the copending patent application of Heunsch et al., Ser. No. 491,905, filed May 5, 1983, now U.S. Pat. No. 4,475,010 entitled "High Density Cellular Mobile Radio Communications," and assigned to the same assignee as the present application. The disclosure of the Heunsch et al. application is hereby incorporated herein by reference. In that method, certain steps involve ranking of signal strengths on the basis of thresholds. However, those signal strengths should first be adjusted by adding to them a value 4 (SDMAC-NMAC) to account for current excess attenuation.

Although the invention has been described in terms of a particular embodiment thereof, it is to be understood that additional embodiments, applications, and modifications which will be obvious to those skilled in the art are included within the spirit and scope of the invention.

What is claimed is:

1. A method for dynamically adjusting operating power levels in a radiotelephone system including at least first and second stations, each having a transmitter and a receiver for a predetermined radio channel, said method comprising the steps of measuring, in said second station, levels of signals received from said first station, adjusting output power of said transmitter of said second station, in response to results of said measuring step, to be at a level which will be received within a predetermined level range at said first statin, determining in said second station an appropriate power level of transmission for said first station to bring said received signal levels at said second station into a predetermined range at said second station and which is independent of said first station range, and directing said first station to adjust its transmitter power to said appropriate power level.

2. The dynamic power adjusting method in accordance with claim 1 in which said first station range lies between a high amplitude limit and a low amplitude limit and said output power adjusting step comprises the steps of computing at the second station an inferred received signal strength at said first station as the sum of received signal strength at said second station of signal from said first station, a power differential between maximum transmitting powers of said first and second stations, and a difference between attenuations of said powers at said first and second stations, and changing said inferred signal strength by the average of said high and low amplitude limits of said first station predetermined range to determine any additional attenuation change required at said second station to bring signal reception at said first station within limits of said first station predetermined range.

3. The dynamic power adjusting method in accordance with claim 1 in which said second station range lies between a high amplitude limit and a low amplitude limit and said determining step comprises the steps of determining whether or not a signal received at said second station from said first station is outside said second station predetermined range, and in response to a last-mentioned determining step determination that said received signal is outside said second station predetermined range, changing a measured signal level obtained in said measuring step by an amount equal to the average of said high and low amplitude limits of said second station predetermined range to determine any additional attenuation change required at said first station to bring signal reception at said second station within said limits of said second station predetermined range.

4. The dynamic power adjusting method in accordance with claim 1 in which there are included the additional steps of periodically screening input signals in said second station with respect to a signal level screening range having upper and lower limits set so that if said received signals in said second station are within said limits, such signals are also within said second station predetermined range, and signals received at said first station are within said first station predetermined range, and actuating said output power adjusting and said determining steps only in response to input signals at said second station which are outside said screening range.

5. The dynamic power adjusting method in accordance with claim 4 in which transmitter power output is adjusted in said first and second stations by changing attenuation of such outputs, and there are included the following additional steps
computing an attenuation difference between stations after said output power adjusting and said directing steps,
adjusting limits of said first station range by at least the amount of said difference, and
changing limits of said screening range so that the high signal level limit thereof is no larger than the smallest of the high signal level limits of said adjusted first station range and said second station range and the low signal level limit thereof is no smaller than the largest of low signal level limits of said adjusted first station range and said second station range.

6. The dynamic power adjusting method in accordance with claim 5 in which
an additional step is included for computing the maximum output power differential between said first and second stations, and
said output power adjusting step includes a step of further adjusting said limits of said first station range by the amount of said differential.

7. The dynamic power adjusting method in accordance with claim 1 in which said stations are in a cellular radiotelephone system and said method comprises the further steps of
locating, as a function of received signal level, said first station as being served by one of plural cells of said cellular system, and
said locating step including the step of detecting a predetermined, cochannel-station-distinguishing tone in a power-adjusted transmission received from said first station.

8. The dynamic power adjusting method in accordance with claim 1 in which said stations are in a cellular radiotelephone system and said method further includes the steps of
modifying, responsive to output of said determining step, signals received from said first station after said directing step to produce an adjusted signal in which effect of said directing step is offset,
comparing said adjusted signal to a predetermined call handoff window, and
initiating handoff of a call from said second station to a further station in response to an adjusted signal level outside said window.

9. The dynamic power adjusting method in accordance with claim 8 in which
said first station is in one of a predetermined plurality of output power classes, and
said modifying step includes the step of further modifying said received signals by the amount of a power class equalization factor for said one class.

10. The dynamic power adjusting method in accordance with claim 8 in which there are included the additional steps of
periodically screening input signals in said second station with respect to a signal level screening range having upper and lower limits set so that if said received signals in said second station are within said limits, such signals are also within said second station predetermined range and signals received at said first station are within said first station predetermined range and signals received at said second station are within said predetermined call handoff window, and
actuating said output power adjusting, determining, and initiating steps only in response to input signals at said second station which are outside said included range.

11. A method for dynamically adjusting operating power levels in a cellular mobile radiotelephone system including at least a first movable station and a second fixed station, each station having a transmitter and a receiver for a predetermined radio channel, at least said fixed station including means for interrupting a subscriber communication on said channel for transmitting a burst of data signal, said method comprising the steps of
measuring, in said fixed station, levels of signals received from said movable station,
adjusting output power of said transmitter of said fixed station, in response to results of said measuring step, to be at a level which will be received within a predetermined level range at said movable station,
determining in said fixed station an appropriate power level of transmission for said movable station to bring said received signal levels at said fixed station into a predetermined range at said fixed station and which is independent of said movable station range, and
directing, by a data signal burst, said movable station to adjust its transmitter power to said appropriate power level in a single step.

* * * * *